US008649028B2

(12) United States Patent
Ohishi

(10) Patent No.: US 8,649,028 B2
(45) Date of Patent: Feb. 11, 2014

(54) IMAGE FORMING APPARATUS AND METHOD FOR ESTABLISHING A CONNECTION WITH A USB DEVICE DRIVER AND APPLICATION

(75) Inventor: Tsutomu Ohishi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1147 days.

(21) Appl. No.: 11/495,569

(22) Filed: Jul. 31, 2006

(65) Prior Publication Data
US 2007/0030495 A1 Feb. 8, 2007

(30) Foreign Application Priority Data

Aug. 4, 2005 (JP) ................................. 2005-226209
Jul. 18, 2006 (JP) ................................. 2006-195982

(51) Int. Cl.
G06F 3/12 (2006.01)
(52) U.S. Cl.
USPC ........................................................ 358/1.13
(58) Field of Classification Search
USPC ...................................... 358/3.15, 3.16, 3.13
See application file for complete search history.

(56) References Cited

U.S. PATENT DOCUMENTS

| 6,947,171 | B1 * | 9/2005 | Narusawa et al. ............... 358/1.6 |
| 7,161,701 | B2 * | 1/2007 | Ogiwara et al. ............... 358/1.15 |
| 7,280,830 | B2 * | 10/2007 | Anderson et al. ........... 455/435.1 |
| 7,489,417 | B2 * | 2/2009 | Tran et al. ..................... 358/1.16 |
| 2003/0028753 | A1 | 2/2003 | Ohishi |
| 2003/0041189 | A1 * | 2/2003 | Choi et al. ....................... 710/15 |
| 2003/0103224 | A1 * | 6/2003 | Johnson et al. ............... 358/1.13 |
| 2003/0133136 | A1 | 7/2003 | Ohishi et al. |
| 2003/0140174 | A1 | 7/2003 | Ohishi et al. |
| 2003/0218765 | A1 | 11/2003 | Ohishi et al. |
| 2004/0057067 | A1 | 3/2004 | Ohishi et al. |
| 2004/0057074 | A1 | 3/2004 | Ohishi et al. |
| 2004/0125414 | A1 | 7/2004 | Ohishi et al. |
| 2004/0128532 | A1 | 7/2004 | Ohishi et al. |
| 2004/0130747 | A1 | 7/2004 | Ohishi et al. |
| 2004/0218208 | A1 | 11/2004 | Akiyoshi et al. |
| 2005/0057771 | A1 | 3/2005 | Ohishi et al. |
| 2006/0082801 | A1 | 4/2006 | Ohishi |

FOREIGN PATENT DOCUMENTS

| JP | 5-265927 | 10/1993 |
| JP | 7-234833 | 9/1995 |
| JP | 2002-84383 | 3/2002 |
| JP | 2003-316711 | 11/2003 |

(Continued)

OTHER PUBLICATIONS

Japanese Office Action issued May 15, 2012, in Japan Patent Application No. 2011-167718.

(Continued)

Primary Examiner — Benny Q Tieu
Assistant Examiner — Sunil Chacko
(74) Attorney, Agent, or Firm — Oblon, Spivak, McClelland, Maier & Neustadt, L.L.P.

(57) ABSTRACT

An image forming apparatus has a connection terminal for connecting and disconnecting a plug-in device, which is configured to be plugged into the connection terminal. The image forming apparatus includes a driver controller that activates a device driver corresponding to the plug-in device in accordance with detection of insertion of the plug-in device. The device driver establishes a connection with an application in response to a connection request from the application that uses the plug-in device.

17 Claims, 10 Drawing Sheets

(56) References Cited

FOREIGN PATENT DOCUMENTS

| JP | 2003-335028 | 11/2003 |
|----|-------------|---------|
| JP | 2004-46802  | 2/2004  |
| JP | 2004-54791  | 2/2004  |
| JP | 2004-310422 | 11/2004 |
| JP | 2005-40974  | 2/2005  |
| JP | 2005-78577  | 3/2005  |

OTHER PUBLICATIONS

Office Action issued May 31, 2011 in Japanese Patent Application No. 2006-195982.

* cited by examiner

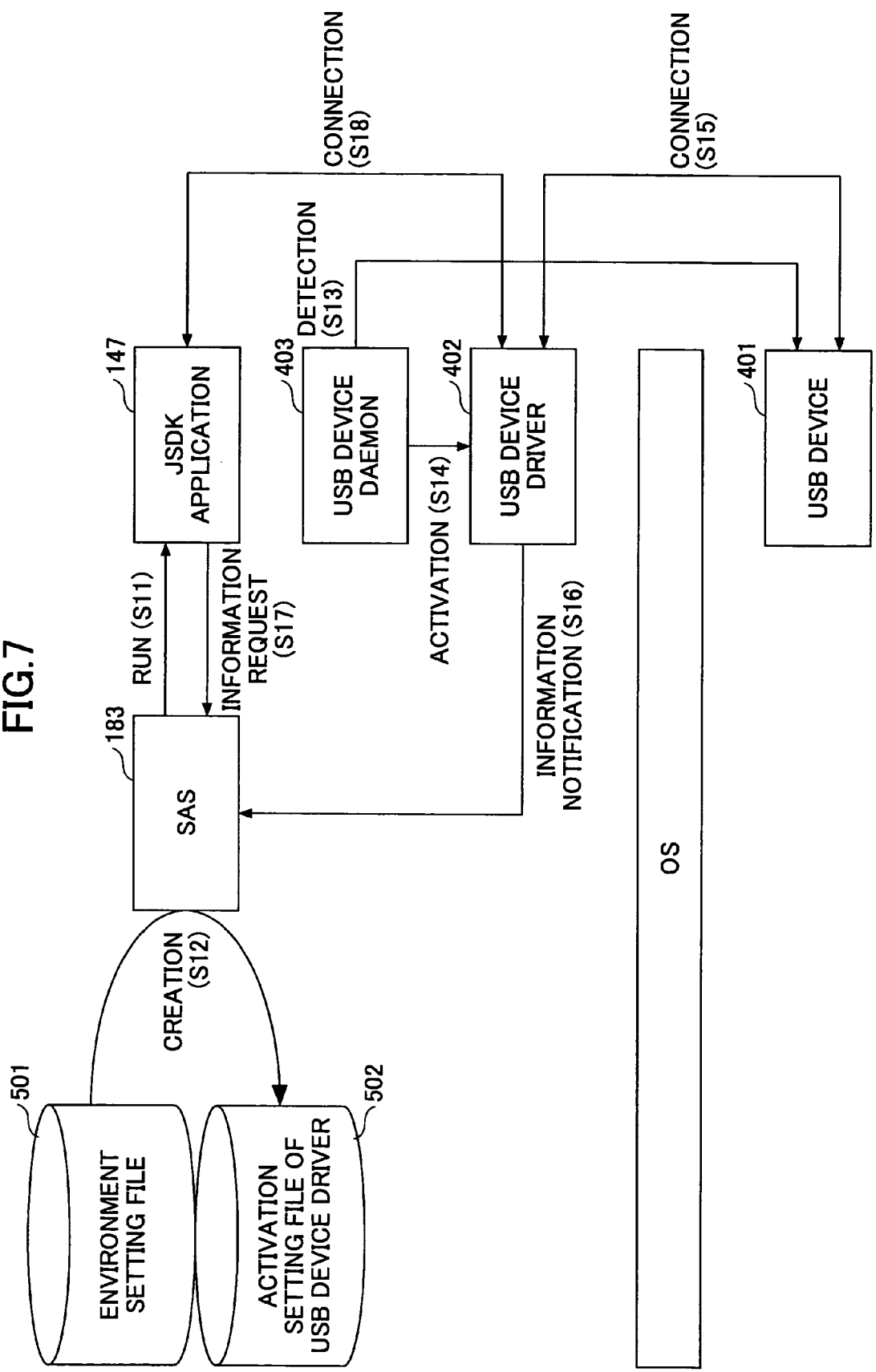

FIG.8

| USB DEVICE DRIVER EXECUTION FILE NAME | USB DEVICE IDENTIFICATION INFORMATION | JSDK APPLICATION IDENTIFICATION INFORMATION |
|---|---|---|

| PRODUCT ID | PROCESS ID | USB DEVICE NAME | SOCKET IDENTIFICATION INFORMATION | ... |
|---|---|---|---|---|

503

IMAGE FORMING APPARATUS AND METHOD FOR ESTABLISHING A CONNECTION WITH A USB DEVICE DRIVER AND APPLICATION

BACKGROUND OF THE INVENTION

1. Field of the Invention

The present invention generally relates to information processing technology and, more particularly to an image forming apparatus such as a copy machine, a printer, a scanner, a facsimile machine or a multi-function peripheral machine and an image processing method and program and a recording medium such as an SD card.

2. Description of the Related Art

In recent years, multi-function peripheral machines having a copy function, a printer function, a scanner function and a facsimile function, have become available in the market. A multi-function peripheral machine prints an image on a print paper when serving as a copy machine or a printer, and reads an image from an original when serving as a copy machine or a scanner, and exchange image data with other equipments through a telephone line when serving as a facsimile machine. Such a multi-function peripheral machine is disclosed in the following Patent Documents 1 and 2.

Patent Document 1: Japanese Laid-Open Patent Application No. 2002-84383

Patent Document 2: Japanese Laid-Open Patent Application No. 2004-54791

In recent years, in many cases, electronic equipment and information technology equipments have been used by being connected with devices according to various standards such as a USB device, an IEEE1349 device, etc. Multi-function peripheral machines are not exception. However, since multi-function peripheral machines are commonly used by many people in many cases and various kinds of programs are executed in various modes in many cases, there is a problem in that which function of the multi-function peripheral machines is used to control a function relating to those devices by which mode.

SUMMARY OF THE INVENTION

It is a general object of the present invention to provide a novel and useful image forming apparatus in which the above-mentioned problems are eliminated.

A more specific object of the present invention is to provide a technique and method for an image forming apparatus, which is used by being connected with devices, to control functions with respect the devices.

In order to achieve the above-mentioned objects, there is provided according to one aspect of the present invention an image forming apparatus having a connection terminal for connecting and disconnecting a plug-in device, which is configured to be plugged into the connection terminal, the image forming apparatus comprising a driver controller that activates a device driver corresponding to the plug-in device in accordance with detection of insertion of said plug-in device, wherein said device driver establishes a connection with an application in response to a connection request from the application that uses said plug-in device.

In the image forming apparatus according to the present invention, the driver controller may activate the device driver corresponding to the plug-in device of which insertion has been detected in accordance with information indicating a correspondence relationship between the plug-in device and the device driver, which is stored in a memory device of the image forming apparatus.

In the image forming apparatus according to the present invention, the device driver may register identification information, which is necessary for communication with the device driver, in a predetermined area of a memory device of the image forming apparatus; and the application may acquire the identification information from the predetermined area and makes a connection request to the device driver using the identification information.

In the image forming apparatus according to the present invention, the application using the plug-in device may be run when the image forming apparatus is started up. The application using the plug-in device may be run when the plug-in device is plugged in.

In the image forming apparatus according to the present invention, the driver controller may activate the device driver in the image forming apparatus when the device driver to be activated exists in the image forming apparatus. The driver controller may activate the device driver acquired from a medium plugged into the image forming apparatus when the device driver to be activated does not exist in the image forming apparatus. The driver controller may activate the device driver acquired from a network connected to the image forming apparatus when the device driver to be activated does not exist in the image forming apparatus.

In the image forming apparatus according to the present invention, the driver controller may shut down the application using the plug-in device when the plug-in device is unplugged.

There is provided according to another aspect of the present invention an information processing method performed by an image forming apparatus having a connection terminal for connecting and disconnecting a plug-in device, which is configured to be plugged into the connection terminal, the information processing method comprising:

a driver controlling procedure of activating a device driver corresponding to the plug-in device in accordance with detection of insertion of the plug-in device; and a connection establishing procedure of establishing by the device driver a connection with an application in response to a connection request from the application that uses the plug-in device.

In the information processing method according to the present invention, the driver controlling procedure may activate the device driver corresponding to the plug-in device of which insertion has been detected in accordance with information indicating a correspondence relationship between the plug-in device and the device driver, which is stored in a memory device of the image forming apparatus.

In the information processing method according to the present invention, the device driver may register identification information, which is necessary for communication with the device driver, in a predetermined area of a memory device of the image forming apparatus; and the application may acquire the identification information from the predetermined area and makes a connection request to the device driver using the identification information.

In the information processing method according to the present invention, the application using the plug-in device may be run when the image forming apparatus is started up. The application using the plug-in device may be run when the plug-in device is plugged in.

In the information processing method according to the present invention, the driver controlling procedure may activate the device driver in the image forming apparatus when the device driver to be activated exists in the image forming apparatus. The driver controlling procedure may activate the device driver acquired from a medium plugged into the image forming apparatus when the device driver to be activated does not exist in the image forming apparatus. The driver controlling procedure may activate the device driver acquired from a network connected to the image forming apparatus when the device driver to be activated does not exist in the image forming apparatus.

In the information processing method according to the present invention, the driver controlling procedure may shut down the application using the plug-in device when the plug-in device is unplugged.

There is provided according to another aspect of the present invention an information processing program executable by a computer to perform the above-mentioned information processing method. Additionally, there is provided according to another aspect of the present invention a computer readable recording medium storing an information processing program executable by a computer to perform the above-mentioned information processing method.

Other objects, features and advantages of the present invention will become more apparent from the following detailed description when read in conjunction with the accompanying drawings.

BRIEF DESCRIPTION OF THE DRAWINGS

FIG. 7 is a block diagram for explaining a function of the multi-function peripheral machine with respect to the USB device;

FIG. 8 is an illustration of information stored in a start setting file;

FIG. 9 is an illustration of a structure of USB driver information;

DETAILED DESCRIPTION OF THE PREFERRED EMBODIMENTS

Figure 1:
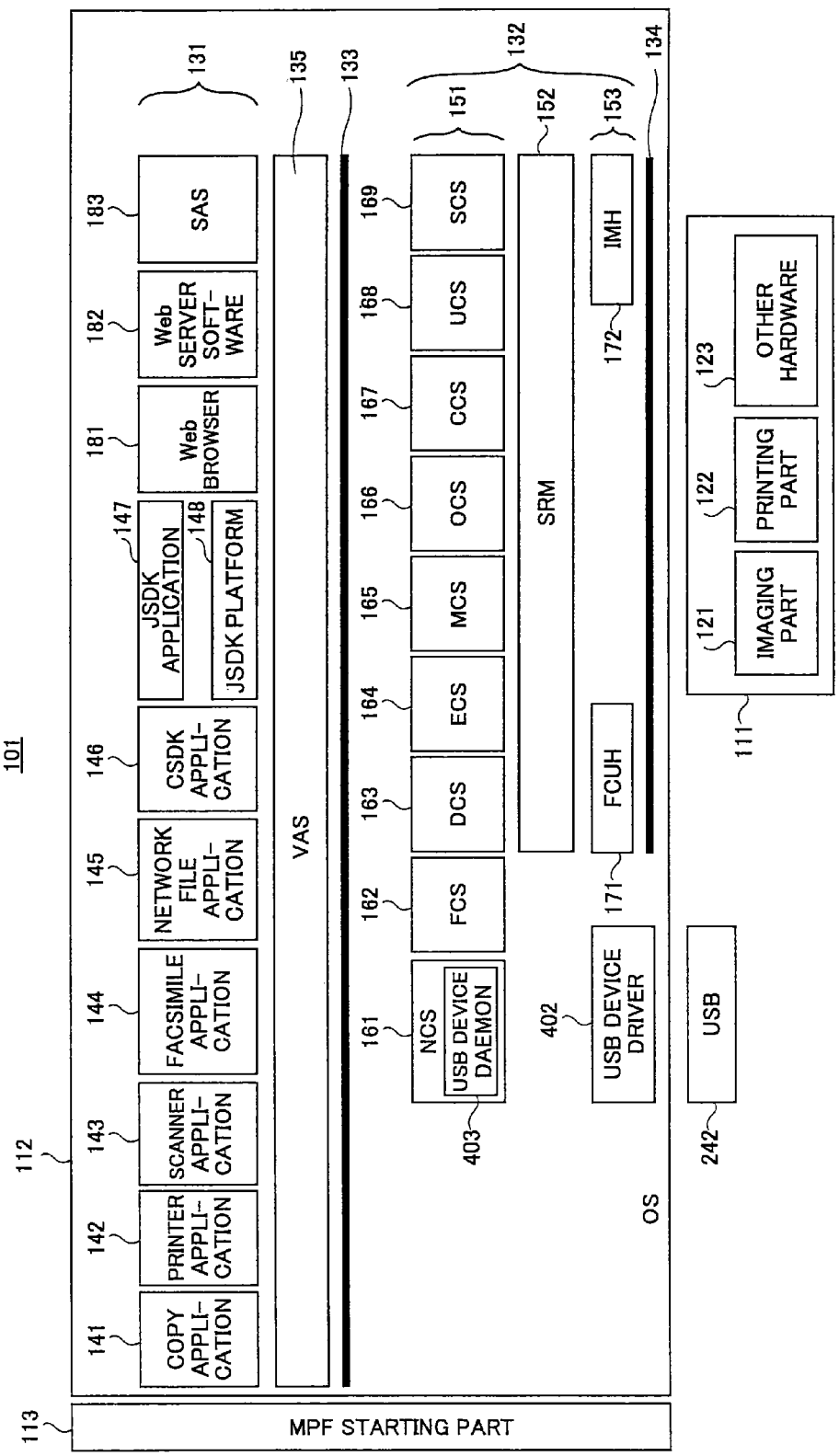
FIG. 1 is a structure diagram of a multi-function peripheral machine according to one embodiment of the present invention.

A description will now be given of a n embodiment of the present invention. FIG. 1 is a block diagram of a multi-function peripheral machine (MFP) 101 (also referred to as a combination machine 101) according to a an embodiment of the present invention. The multi-function peripheral machine 101 shown in FIG. 1 comprises a hardware part 111, a software part 112 and a multi-function peripheral machine (MFP) starting part 113.

The hardware part 111 of the combination machine 101 includes an imaging part 121, a printing part 122 and other hardware parts 123. The imaging part 121 is a hardware part for reading an image (image data) of an original document to be read. The printing part 122 is a hardware part for printing an image (image data) on a print paper.

In the software part 112 of the multi-function peripheral machine 101, there is an application 131, which includes various kinds of applications, and a platform 132, which includes various kinds of platforms. These programs are executed in parallel on an individual process basis by an operating system (OS) such as the UNIX (Registered Trademark).

The application 131 is provided with a copy application 141 which is an application used for copying, a printer application 142 which is an application used for a printer, a scanner application 143 which is an application for a scanner, a facsimile application 144 which is an application used for a facsimile machine, and a network file application 145 which is an application used for a network file. Additionally, the application 131 includes a Web browser 181 which is software for reviewing Web pages, a Web server software 182 which is software for distributing Web pages, and an SDK application service (SAS) 183 which is software for controlling a CSDK application 146 and a JSDK application 147.

The application 131 can be developed using a software development kit (SDK) for exclusive use. The application 131 developed using the SDK is referred to as the SDK application 131. As for the SDK for exclusive use, there are provided "CSDK", which is used for developing the application 131 according to C language and "JSDK", which is used for developing the application 131 according to Java (Registered Trademark). The application 131 developed using the CSDK is referred to as a CSDK application, and the application 131 developed using the JSDK is referred to as a JSDK application. The application 131 of the multi-function peripheral machine 101 of FIG. 1 includes the CSDK application 146 and the JSDK application 147 as well. The multi-function peripheral machine 101 of FIG. 1 further includes a JSDK platform 148 as software for mediating between the JSDK application 147 described in the Java (Registered Trademark) language and another software described in the C language.

The platform 132 includes a control service part 151 including various kinds of control services, a system resource manager 152 and a handler 153. The control service 151 includes a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handler 153 includes a facsimile control unit handler (FCUH) 171 and an image memory handler (IMH) 172. Further, there is provided a USB device driver 402 for controlling devices connected to a USB port 242.

The process of the NCS 161 mediates network communications and communications with various kinds of devices connected to the multi-function peripheral machine 101. For example, the NCS 161 activates a USB device daemon 403, as a separate process, as a part of the function thereof. The USB device daemon 403 will be described in detail later. The process of the FCS 162 provides API of a facsimile. The process of the DCS 163 performs a control with respect to distribution processing of accumulated documents. The process of the ECS 164 performs a control of the imaging part 121 and the printing part 122. The process of the MCS 165 performs a control with respect to memories and a hard disk drive. The process of the OCS 166 performs a control with respect to the operation panel. The process of the CCS 167 performs a control with respect to an authentication process or a fee-charging process. The process of the UCS 168 performs a control with respect to management of user information. The process of the SCS 169 performs a control with respect to management of the system.

There is provided a virtual application service (VAS) 135 as software mediating between the application 131 and the platform 132. The VAS 135 operates as a server process, which sets the application 131 as a client, and also serves as a client process, which sets the platform 132 as a server. The VAS 135 is provided with a wrapping function to mask the platform 132 when viewing from the application 131 so as to play a role to absorb a version difference associated with version upgrade.

The multi-function peripheral machine (MFP) starting part 113 is operated first after a power is supplied to the multi-function peripheral machine 101. Thereby, an OS such as UNIX (registered trademark) is booted, and the application 131 and the platform 132 are activated. These programs are accumulated in a hard disk drive or a memory card so that the programs are stored in a memory after being retrieved from the hard disk drive or the memory card.

Figure 2:
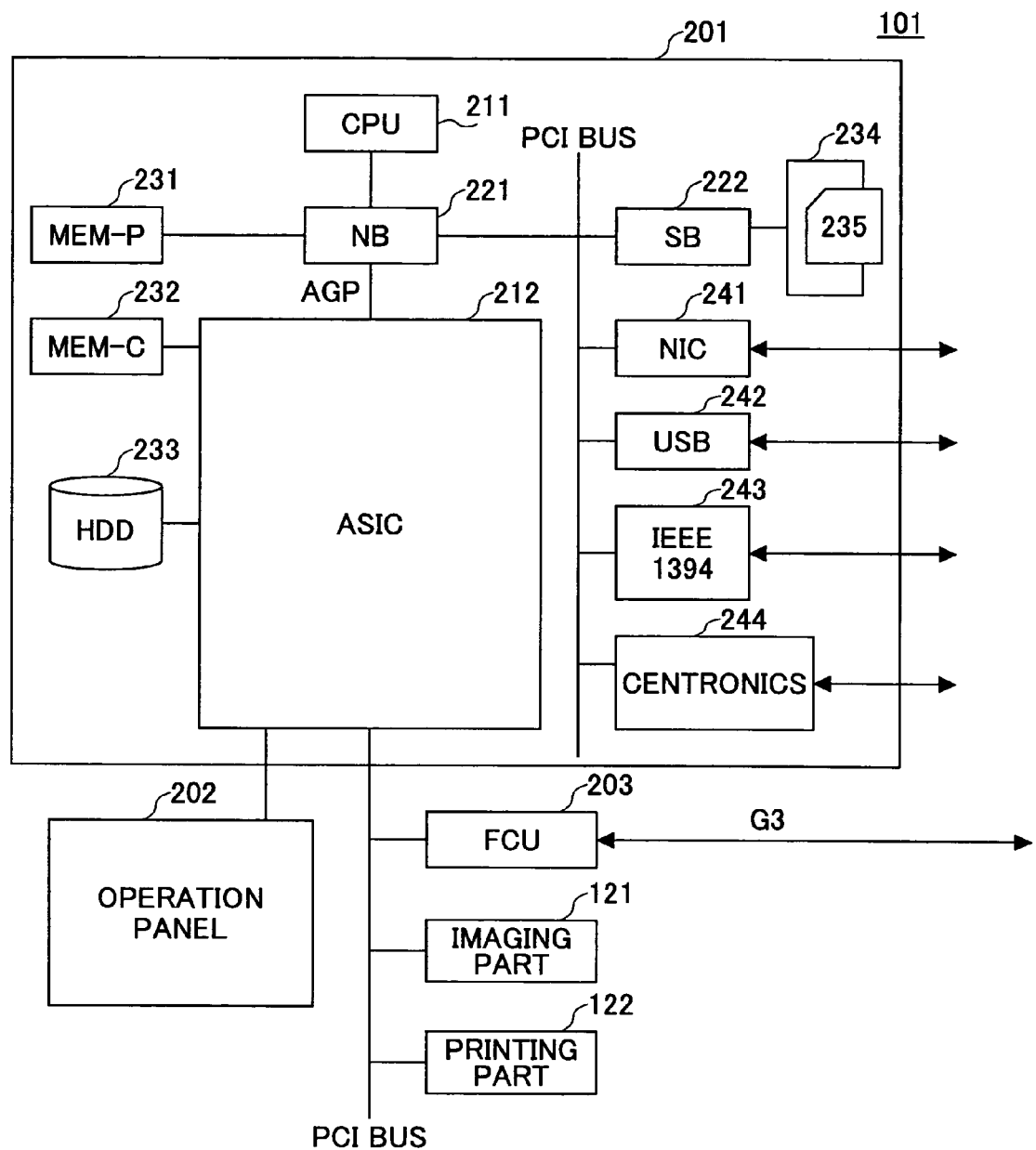
FIG. 2 is a block diagram of a hardware of the multi-function peripheral machine shown in FIG. 1.

FIG. 2 is a hardware block diagram of the multi-function peripheral machine 101 of FIG. 1. As the hardware part 111 of the combination machine 101, there are a controller 201, an operation panel 202, a facsimile control unit (FCU) 203, the imaging part 121 and the printing part 122.

The controller 201 comprises a central processing unit (CPU) 211, an application specification integrated circuit (ASIC) 212, a North bridge (NB) 221, a South bridge (SB) 222, a memory for printer (MEM-P) 231, a memory for computer (MEM-C) 232, a hard disk drive (HDD) 233, a memory card slot 234, a network interface controller (NIC) 241, a USB interface (IF) 242, an IEEE1394 interface (IF) 243, and a Centronics interface 244.

The CPU 211 is an integrated circuit (IC) for various information processing. The ASIC 212 is an IC for various picture processing. The NB 221 is a North bridge of the controller 201. The SB 222 is a South bridge of the controller 201. The MEM-P 231 is a system memory of the multi-function peripheral machine 101. The MEM-C 232 is a local memory of the multi-function peripheral machine 101. The HDD 233 is a storage of the multi-function peripheral machine 101. The memory card slot 234 is a slot for loading a memory card 235. The NIC 241 is a controller for network communication according to a media access control (MAC) address. The USB interface 242 is an interface for providing a connection terminal according to the USB specification. The IEEE1394 interface 243 is an interface for providing a connection terminal according to the IEEE1394 specification. The Centronics interface 244 is an interface for providing a connection terminal according to the Centronics specification.

The operation panel 202 is a hardware (operation part) for an operator to input instructions or data to the multi-function peripheral machine 101, and also a hardware (display part) for acquiring an output from the multi-function peripheral machine 101.

Figure 3:
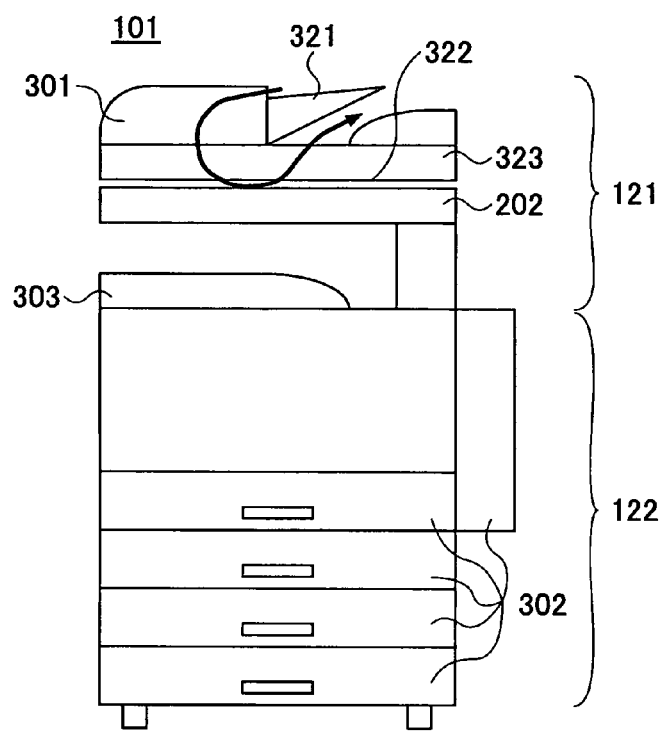
FIG. 3 is an elevation view of the multi-function peripheral machine shown in FIG. 1.

FIG. 3 is an elevation view of the multi-function peripheral machine 101 of FIG. 1. In FIG. 3, the locations of the imaging part 121, the location of the printing part 122 and the location of the operation panel 202 are illustrated. FIG. 3 also illustrates an original-document setting part 301 onto which an original document is set, a paper-supply part 302 to which printing papers are supplied, and a paper-eject part 303 onto which the print papers are ejected.

Figure 4:
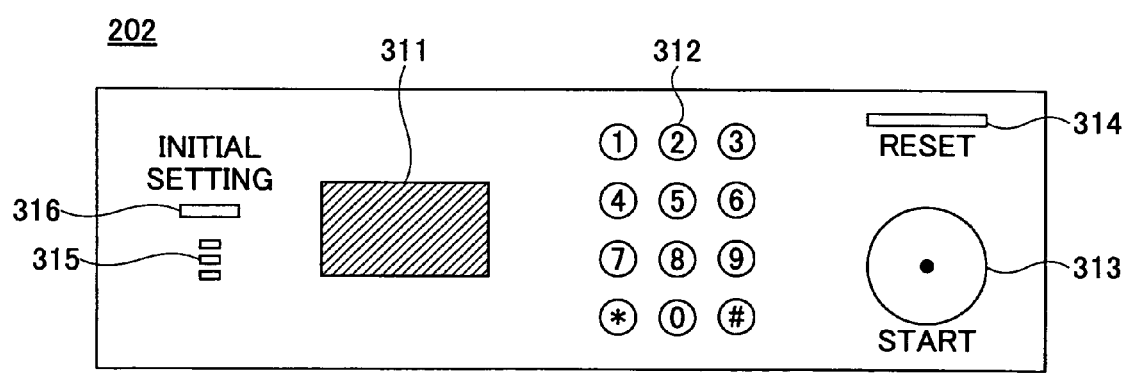
FIG. 4 is an illustration showing an operation panel.

The operation panel 202 comprises, as shown in FIG. 4, a touch panel 311, a ten key 312, a start button 313, a reset button 314, a function key 315 and an initial-setting button 316. The touch panel 311 is a hardware (touch operation part) for performing an input by a touch operation, and also a hardware (screen display part) for obtaining an output through a screen display. The ten key 312 is a hardware for performing a figure input by operation of keys (buttons). The start button 313 is a hardware for performing a start operation by a button operation. The reset button 314 is a hardware for performing a reset operation by a button operation. The function key 315 is a hardware for causing the display screen to display an operation screen according to the CSDK application 146 or the JSDK application 147 by a key (button) operation. The initial-setting button 316 is a hardware for causing an initial-setting screen to be displayed by a button operation.

The original-document set part 301 comprises an automatic document feeder (ADF) 321, a flat bed 322 and a flat bed cover 323. The paper-supply part 302 comprises four paper-feed trays. The paper-eject part 303 comprises one paper-eject tray. A plurality of sheets of original document can be set in a stacked state in the ADF 321. An original document is set to the flat bed 322 with a front side facing downward.

Figure 5:
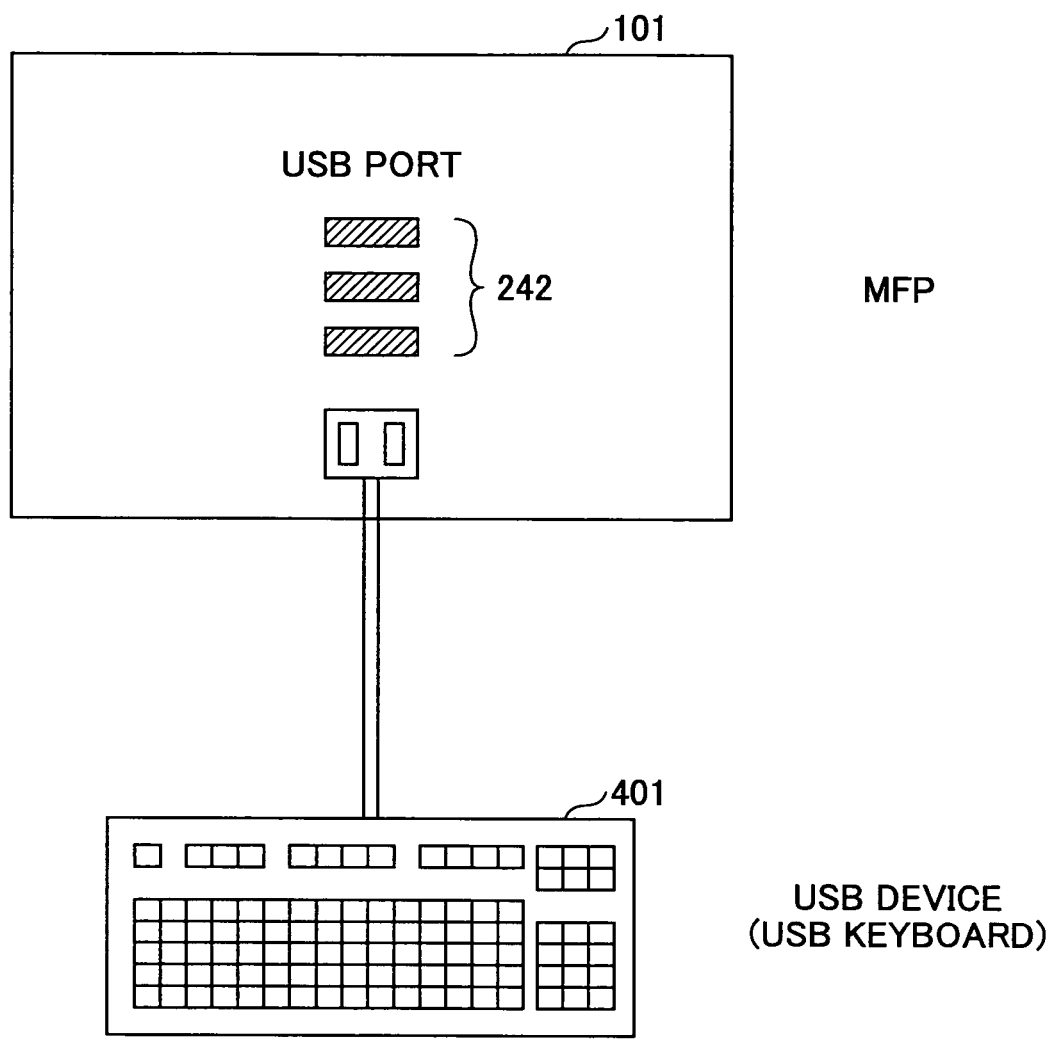
FIG. 5 is an illustration showing the multi-function peripheral machine connected with a USB device.

FIG. 5 shows the multi-function peripheral machine 101 used with the USB (Universal Serial Bus) device 401 connected thereto.

The USB device 401 is a plug-in device that can be hot-plugged to an equipment having a USB port, which is a connection terminal according to the USB standard. The multi-function peripheral machine 101 of FIG. 1 also has the USB port 242 for connecting the USB device 401. The hot-plug feature of the USB device 401 is preferable to image forming apparatuses since frequent turning on and off of a power supply is not preferable to image forming apparatuses.

A USB memory, a USB keyboard and a USB mouse are specific examples of the USB device 401. In order to use the USB device 401 in a certain equipment, a USB driver for using the USB device 401 is necessarily provided in the equipment. When using a USB memory, a driver for the USB memory is needed. When using a USB keyboard, a driver for the USB keyboard is needed. When using a USB mouse, a driver for the USB mouse is needed. The USB device driver for using the USB device 401 by the multi-function peripheral machine 101 of FIG. 1 will be explained later.

Figure 6A:
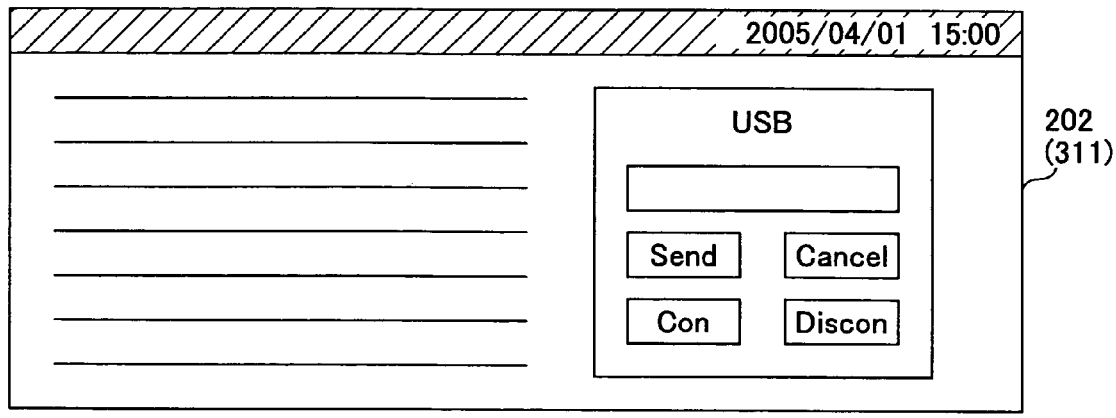
FIGS. 6A, 6B and 6C are illustrations showing an operation screen provided by a JSDK application using the USB device.
Figure 6B:
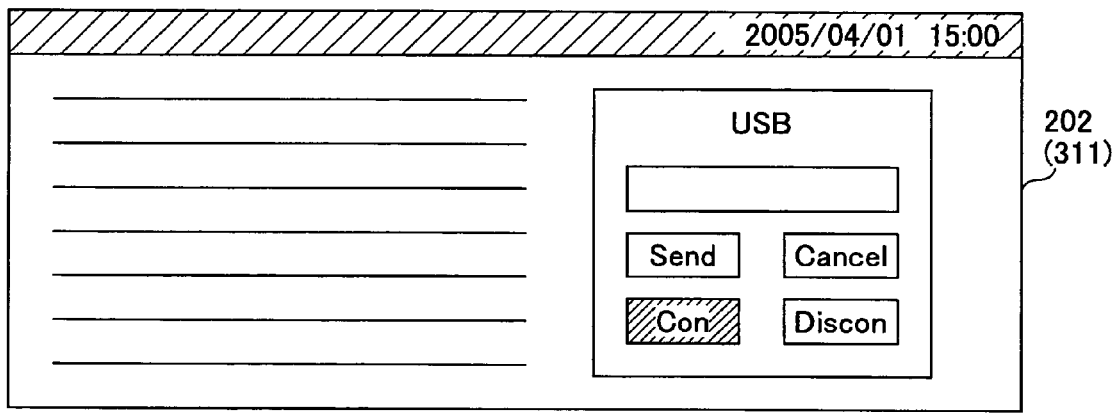
Figure 6C:
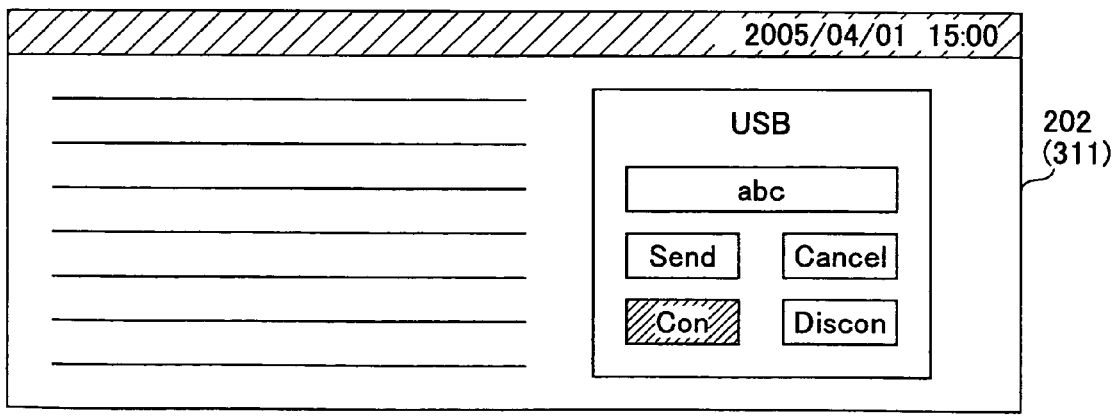

FIGS. 6A, 6B and 6C show specific examples of the operation screen provided by the JSDK application 147 using the USB device 401. Specific examples of the JSDK application 147 are a JSDK application for a scanner which accumulates data in a USB memory, a JSDK application for a printer which acquires data form a USB memory and a JSDK application which receives an input operation through a USB keyboard.

When the JSDK application is run, the operation screen of FIG. 6A is displayed on the operation panel 202. If a button "Con" is touched in the operation screen of FIG. 6A, an input operation of the USB keyboard plugged into the multi-function peripheral machine 101 is turned to be effective, and the screen is shifted to the operation screen of FIG. 6B. Then, if a button "Discon" is touched in the operation screen of FIG. 6B, the input operation of the USB keyboard plugged into the multi-function peripheral machine 101 is returned to be ineffective, and the screen shifts to the operation screen of FIG. 6A. If keys A, B and C of the USB keyboard are pressed sequentially in the state where the operation screen of FIG. 6B is displayed, letters "abc" are displayed on the operation screen as shown in FIG. 6C.

FIG. 7 is a software block diagram for explaining a software mechanism of the multi-function peripheral machine 101 with respect to the USB device 401. As software with respect to the USB device 401, the USB device driver 402 and the USB device daemon 403 exist in the HDD 233 or the like in the multi-function peripheral machine 101. The USB device driver 402 is a driver (program) for using the USB device 401 in the multi-function peripheral machine 101. The USB device daemon 403 is a daemon (program) for monitoring plugging of the USB device 401 to the USB port 242.

If it is detected that the USB device 401 is inserted into the USB port 242, the USB device daemon 403 activates the USB device driver 402 for using the USB device 401 concerned. On the other hand, if it is detected that the USB device 401 is removed from the USB port 242, the USB device daemon 403 deactivates the USB device driver 402 for using the USB device 401 concerned. That is, the USB device daemon 403 automatically activates and deactivates the USB device driver 402 for using the USB device 401 in response to insertion and removal of the USB device 401.

A description will now be given of information processing when the multi-function peripheral machine 101 is started up.

When a power of the multi-function peripheral machine is turned on, the SAS 183 causes the JSDK application 147 to run (S11). Then, the SAS 183 creates on the HDD 233 an activation setting file 502 of the USB device driver 402 from the environment setting file 501 of the SDK application (S12).

FIG. 8 is an illustration of an example of a structure of the information stored in the activation setting file. As shown in FIG. 8, an execution file name of the USB device driver 402, identification information of the USB device 401 corresponding to the USB device driver 402, and identification information of the JSDK application 147 using the USB device 401 are stored in the activation setting file 502. That is, the activation setting file 502 stores correspondence information between the USB device driver 402, the USB device 401 and the JSDK application 147.

The information stored in the activation setting file 502 is extracted from the environment setting file 501. That is, the environment setting file 501 stores information (for example, an application name, a used size of a memory, a kind of application, etc.) regarding various settings of each SDK application (including the CSDK application 146 and the JSDK application 147). The SAS 183 manages each SDK application by referring to the environment setting file 501. In the present embodiment, the USB device driver 402 is handled as one of the SDK applications. Therefore, as to the USB device driver 402, information regarding various kinds of setting is stored similar to other SDK application. However, with respect to the USB device driver 402, information peculiar to the USB device driver 402 is stored as expansion information in the environment setting file 501 so that the expansion information is extracted in step S12 to create the activation setting file 502. It should be noted that when a plurality of USB device drivers 402 are registered in the environment setting file 501, the activation setting files 502 for the plurality of USB device drivers 402 are created. Determination as to which application is the USB driver 402 among the SDK applications registered in the environment setting file 501 is made based on kinds of applications registered in the environment setting file 501 for each SDK application. Therefore, as to the USB device drover 402, information regarding various kinds of setting is stored similar to other SDK application. However, with respect to the USB device driver 402, information peculiar to the USB device driver 402 is stored as expansion information in the environment setting file 501 so that the expansion information is extracted in step S12 to create the activation setting file 502. It should be noted that when a plurality of USB device drivers 402 are registered in the environment setting file 501, the activation setting files 502 for the plurality of USB device drivers 402 are created. Determination as to which application is the USB driver 402 among the SDK applications registered in the environment setting file 501 is made based on kinds of applications registered in the environment setting file 501 for each SDK application.

If the USB device 401 is inserted into the USB port 242 when the power supply of the multi-function peripheral machine 101 is turned on, the USB device daemon 403 detects that the USB device 401 is inserted (S13). Then, based on the identification information of the detected USB device 401, the USB device daemon 403 searches for the USB device driver 402 corresponding to the USB device 401 concerned from the activation setting file 502, and activates the searched USB device driver 402 as a process (S14).

In should be noted that, if the USB device driver 402 to be activated in S14 exists in the multi-function peripheral machine 101, the USB device driver 402, which exists in the multi-function peripheral machine 101, is activated as shown in FIG. 7. On the other hand, if the USB device driver 402 to be activated in S14 does not exist in the multi-function peripheral machine 101, the USB driver to be activated in S14 is acquired (downloaded) from a medium (for example, an SD card) plugged into the multi-function peripheral machine 101 or a network (for example, a Web site) connected to the multi-function peripheral machine 101 and the acquired USB device driver is activated. Then, a connection is established between the USB device 401 detected in S13 and the USB device driver 402 activated in S14 (S15).

Subsequently, the USB device driver 402 activated in S14 notifies the SAS 183 of information (hereinafter, referred to as "USB device driver information") regarding various kinds of setting of the USB device driver 402 concerned (S16). Upon receipt of the notification, the SAS 183 stores the USB device driver information in a predetermined memory area (for example, a predetermined area in the MEM-P 231) of the multi-function peripheral machine 101 and manages the USB device driver information.

FIG. 9 is an illustration showing an example of a structure of the USB device driver information. As shown in FIG. 9, the USB device driver information 503 includes a product ID of the USB device driver 402 concerned, a process ID, a name of the USB device 401 corresponding to the USB device driver 402 concerned, identification information of a socket for performing a socket communication with USB device driver 402 concerned, etc. It should be noted that the USB device driver 402, after being activated, is on standby while opening a socket as a server, and the identification information of the socket is contained in the USB device driver information 503.

Subsequently, the JSDK application 147 caused to run in S11 requests the USB device driver information 503 to the SAS 183 (S17). Upon receipt of the request, the SAS 183 returns the information. It should be noted that the request by the JSDK application 147 may be made according to polling or interruption by the SAS 183 received the notification in S16, after activation of the JSDK application 147. Then, based on the USB device driver information 503, a connection of a socket is established between the JSDK application 147 which has been run in S11 and the USB device driver 402 which has been activated in S11 (S18). More specifically, the JSDK application 147 requests a connection of socket communication to the USB device driver as a client based on the identification information of the socket contained in the USB device driver information 503. Upon receipt of the JSDK application 147 by the JSDK application, a connection is established between the JSDK application 147 and the USB device driver 402. It should be noted that the information processing with respect to the socket is performed by an operating system (OS) such as the UNIX (registered trademark).

As mentioned above, the USB device daemon 403 is taking charge of activation processing and shut down processing of the USB device driver 402. Conventionally, such processing is in charge of the operating system (OS). Since the USB device daemon 403 is taking charge of activation processing and shut down processing of the USB device driver 402, the detailed activation processing and shut down processing are achieved, which considers mode of carrying out the JSDK application using the USB device 401. For example, the USB device driver 402 corresponding to the JSDK application 147 is automatically activated and shut down, or the USB device driver 402 corresponding to the JSDK application 147 is automatically acquired from a medium or a network. According to the automatic acquisition from a medium, labor of installing the USB device driver 402 is reduced. According to the automatic acquisition from a network, labor of preparing a medium is also reduced. It should be noted that the information processing of FIG. 7 is also shown in the sequence chart of FIG. 10. The step numbers are in common between FIG. 7 and FIG. 10.

Figure 10:
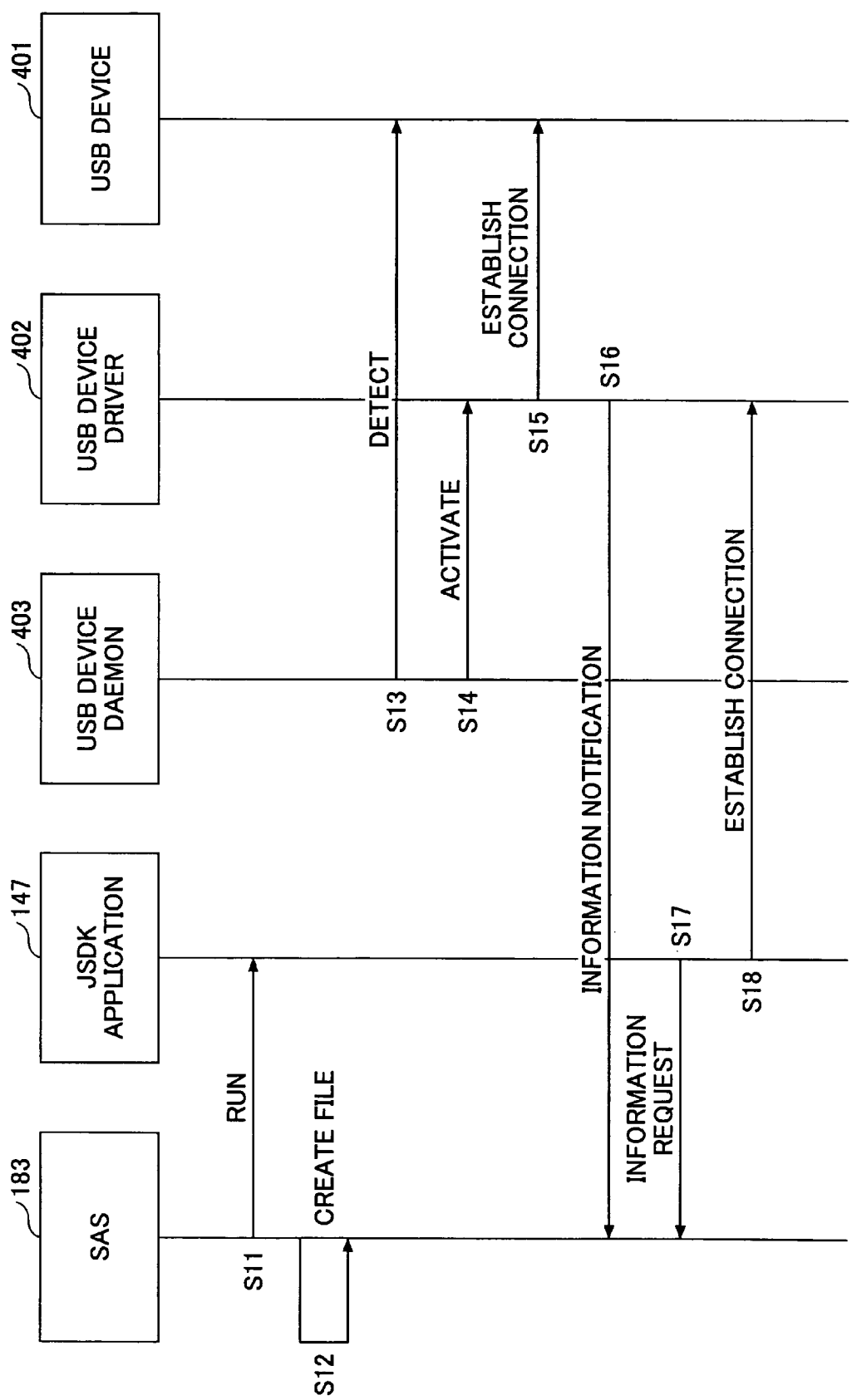
FIG. 10 is a sequence chart of information processing shown in FIG. 7.
Figure 11:
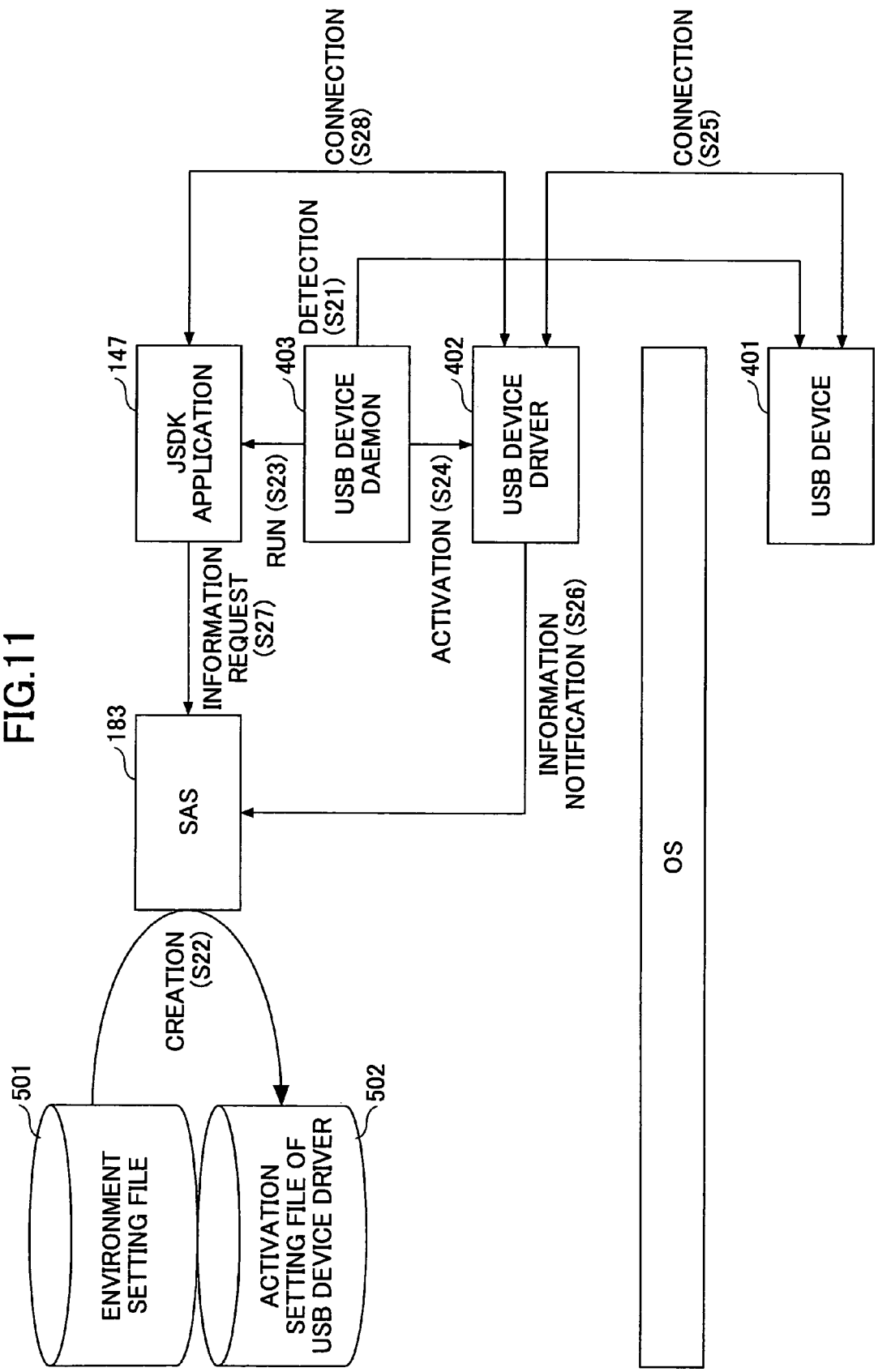
FIG. 11 is a block diagram for explaining a function of the multi-function peripheral machine with respect to the USB device.
Figure 12:
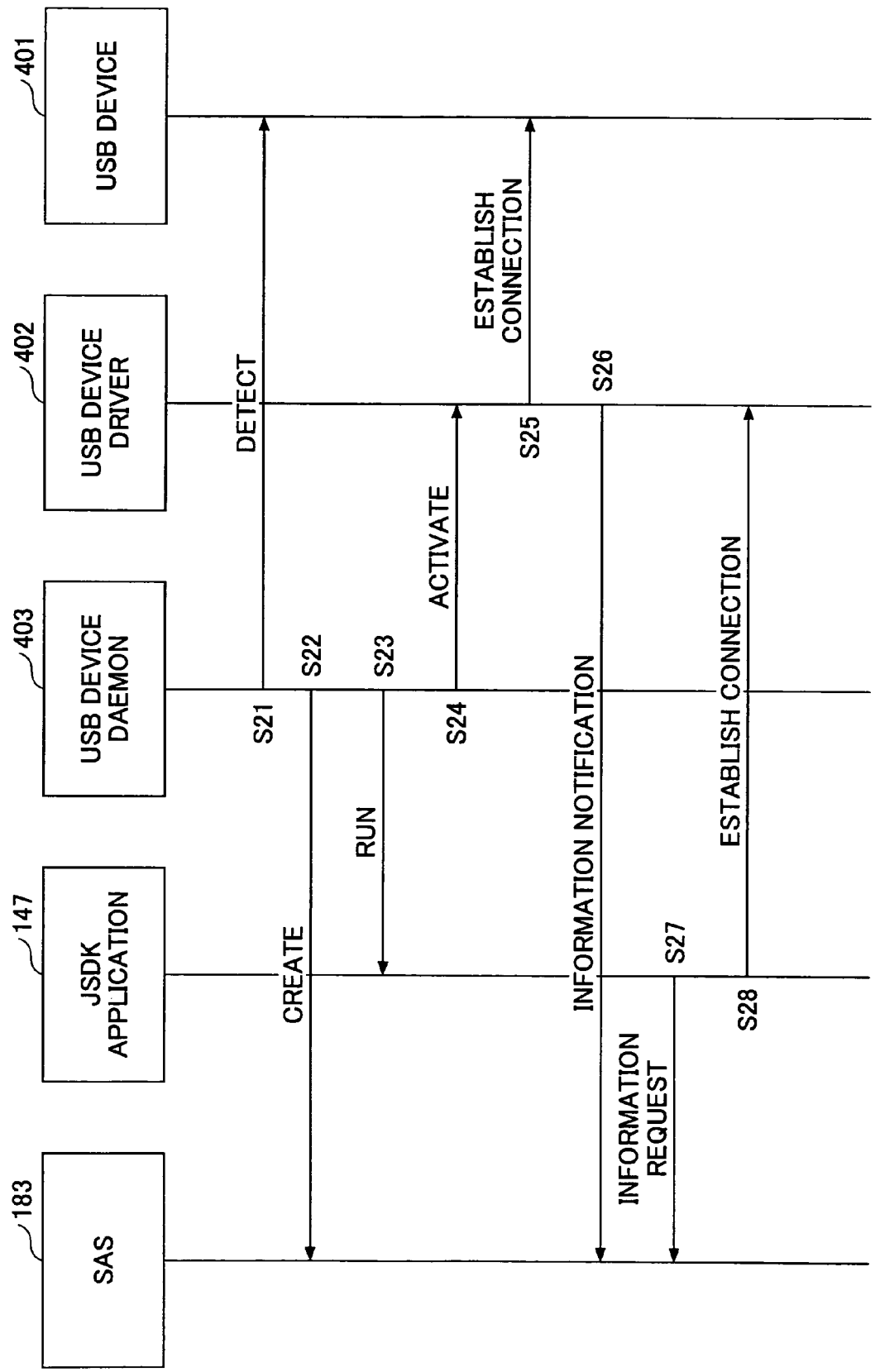
FIG. 12 is a sequence chart of information processing shown in FIG. 11.

In the mode of operation shown in FIG. 7 and FIG. 10, the JSDK application 147 using the USB device 401 is caused to run when the multi-function peripheral machine 101 is started up. In the mode of operation shown in FIG. 11 and FIG. 12, the JSDK application 147 using the USB device 401 is caused to run when the USB device 401 is inserted into the USB port 242. FIG. 11 is a software block diagram similar to FIG. 7. FIG. 12 is a sequence chart similar to FIG. 10.

Hereafter, information processing when the USB device 401 is inserted is explained.

If the USB device 401 is inserted into the USB port 242 when the power supply of the multi-function peripheral machine 101 is turned on, the USB device daemon 403 detects that the USB device 401 was inserted (S21). Then, the USB device daemon 403 causes the SAS 183 to create the activation setting file 502 from the environment setting file 501 (S22). Subsequently, the USB device daemon 403 searches for the JSDK application 147 corresponding to the USB device 401 (using the USB device 147) from the activation setting file 502 based on the identification information of the detected USB device 401, and caused to run the searched JSDK application 147 (S23). Then, the USB device daemon 403 caused to activate the USB device driver 402 corresponding to the JSDK application, which has been run in S23 by referring to the activation setting file 502 (S24). Then, a connection is established between the USB device 401 detected in S21 and the USB device driver 402 activated in S24 (S25).

Then, the USB device driver 402 activated in S24 notifies the SAS 183 of the USB device driver information 503 (S26). Upon reception of the notification, the SAS 183 manages the information concerned. Subsequently, the JSDK application 147, which has been run in S23, requests the USB device driver information 503 to the SAS 183 (S27). Upon receipt of the request, the SAS 183 returns the information concerned. It should be noted that the request by the JSDK application 147, after being activated, may be carried out by polling or interruption by the SAS 183 which received the notification of the step S26. Then, based on the USB device driver information 503, a connection of a socket is established between the JSDK application 147 which has been run in S24 and the USB device driver 402 which has been started in S24 (S28).

As mentioned above, the USB device daemon 403 according to the present embodiment causes to run the JSDK application 147 using the USB device 401 when detecting that the USB device 401 is inserted into the USB port 242, and shuts down the JSDK application 147 when detecting that the USB device 401 is removed from the USB port 242. That is, the USB device daemon 403 automatically causes the JSDK application 147 to run and shut down in response to insertion and removal of the USB device 401.

It should be noted that the example in which the SAS 183 controlling operations of the JSDK application 147 manages information such as the activation setting file or the USB device driver information 503, necessary for establishing a connection between the JSDK application 147 and the USB device driver 402 has been explained in the above-mentioned embodiment. However, this does not mean that the information concerned must be managed by a module that controls operations of the JSDK application 147. For example, a module managing the information concerned may be provided separately from the SAS 183.

The present invention is not limited to the specifically disclosed embodiments, and variations and modifications may be made without departing from the scope of the present invention.

The present application is based on Japanese priority applications No. 2005-226209 filed Aug. 4, 2005 and No. 2006-195982 filed Jul. 18, 2006, the entire contents of which are hereby incorporated herein by reference.

What is claimed is:

1. An image forming apparatus having a connection terminal for connecting and disconnecting plural plug-in devices, which are configured to be plugged into the connection terminal, the image forming apparatus comprising:
    an imaging hardware part that reads an image of an original document to be read;
    a printing hardware part that prints the image on a print paper;
    a driver controller that activates a device driver corresponding to a plug-in device of the plural plug-in devices in accordance with a detection of an insertion of said plug-in device; and
    a management part that manages information of device drivers corresponding to different plug-in devices and applications using the plural plug-in devices, wherein
    an application using the inserted plug-in device requests information of the device driver activated by the driver controller from the management part and the device driver establishes a connection with the application in response to a connection request from the application, and
    said device driver registers identification information, which is for a communication with the device driver, in a predetermined area of a memory device of said image forming apparatus, and said application acquires the identification information from said predetermined area and makes a connection request to said device driver using the identification information.

2. The image forming apparatus as claimed in claim 1, wherein said driver controller activates said device driver corresponding to said plug-in device of which the insertion has been detected in accordance with information indicating a correspondence relationship between said plug-in device and said device driver, which is stored in a memory device of said image forming apparatus.

3. The image forming apparatus as claimed in claim 1, wherein said application using said plug-in device is run when said image forming apparatus is started up.

4. The image forming apparatus as claimed in claim 1, wherein said application using said plug-in device is run when said plug-in device is plugged in.

5. The image forming apparatus as claimed in claim 1, wherein said driver controller activates said device driver in said image forming apparatus when said device driver to be activated exists in said image forming apparatus.

6. The image forming apparatus as claimed in claim 1, wherein said driver controller activates said device driver, which is acquired from a medium plugged into said image forming apparatus, when said device driver to be activated does not exist in said image forming apparatus.

7. The image forming apparatus as claimed in claim 1, wherein said driver controller activates said device driver, which is acquired from a network connected to said image forming apparatus, when said device driver to be activated does not exist in said image forming apparatus.

8. The image forming apparatus as claimed in claim 1, wherein said driver controller shuts down said application using said plug-in device when said plug-in device is unplugged.

9. An information processing method performed by an image forming apparatus having a connection terminal for connecting and disconnecting plural plug-in devices, which are configured to be plugged into the connection terminal, the information processing method comprising:
reading, with an imaging hardware part of the image forming apparatus, an image of an original document to be read;
printing, with a printing hardware part of the image forming apparatus, the image on a print paper;
activating a device driver corresponding to a plug-in device of the plural plug-in devices in accordance with a detection of an insertion of said plug-in device;
managing, with a management part, information of device drivers corresponding to different plug-in devices and applications that use the plural plug-in devices; and
establishing, by said device driver activated in the activating, a connection with an application using the inserted plug-in device in response to a connection request from the application, wherein
the application previously requests information of the device driver from the management part, and
said device driver registers identification information, which is for a communication with the device driver, in a predetermined area of a memory device of said image forming apparatus, and said application acquires the identification information from said predetermined area and makes a connection request to said device driver using the identification information.

10. The information processing method as claimed in claim 9, wherein said activating activates said device driver corresponding to said plug-in device of which the insertion has been detected in accordance with information indicating a correspondence relationship between said plug-in device and said device driver, which is stored in a memory device of said image forming apparatus.

11. The information processing method as claimed in claim 9, further comprising:
setting the application as a client to a virtual application service.

12. The information processing method as claimed in claim 9, further comprising:
creating an activation setting file upon a power of the image forming apparatus being turned on, the activation setting file including an execution file name of the device driver, identification information of the plug-in device, and identification information of the application.

13. The information processing method as claimed in claim 12, further comprising:
causing, with a device controller, a software development kit application service to create the activation setting file.

14. The information processing method as claimed in claim 13, further comprising:
searching, with the device controller, for the application corresponding to the plug-in device from the activation setting file based on the identification information of the plug-in device; and
causing, with the device controller, the application to run.

15. The information processing method as claimed in claim 9, wherein a driver controller, which performs the activating, includes a product ID of the device driver, a name of the plug-in device corresponding to the device driver, and identification information of a socket for performing a socket communication with the device driver.

16. The information processing method as claimed in claim 9, further comprising:
carrying out, with the application, a request by a polling or an interruption by a software development kit application service.

17. A non-transitory computer readable recording medium storing an information processing program executable by a computer to perform an information processing method performed by an image forming apparatus having a connection terminal for connecting and disconnecting plural plug-in devices, which are configured to be plugged into the connection terminal, the information processing method comprising:
controlling an imaging hardware part of the image forming apparatus to read an image of an original document to be read;
controlling a printing hardware part of the image forming apparatus to print the image on a print paper;
activating a device driver corresponding to a plug-in device of the plural plug-in devices in accordance with a detection of an insertion of said plug-in device;
managing, with a management part, information of device drivers corresponding to different plug-in devices and applications that use the plural plug-in devices; and
establishing, by said device driver activated in the activating, a connection with an application using the inserted plug-in device in response to a connection request from the application,
wherein the application previously requests information of the device driver from the management part, and
said device driver registers identification information, which is for a communication with the device driver, in a predetermined area of a memory device of said image forming apparatus, and said application acquires the identification information from said predetermined area and makes a connection request to said device driver using the identification information.

* * * * *